J. KLUNDER.
DIRECTION INDICATOR AND TAIL LIGHT FOR VEHICLES.
APPLICATION FILED NOV. 5, 1919.
1,351,913.
Patented Sept. 7, 1920.
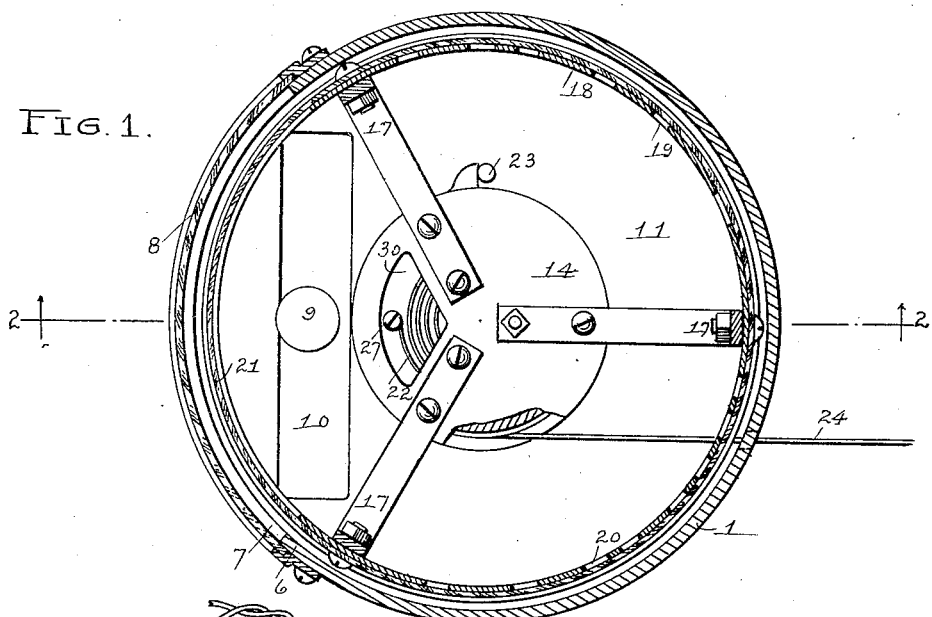
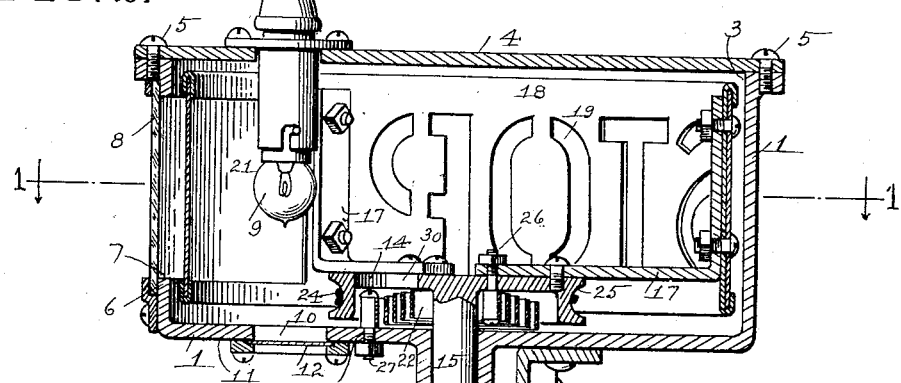
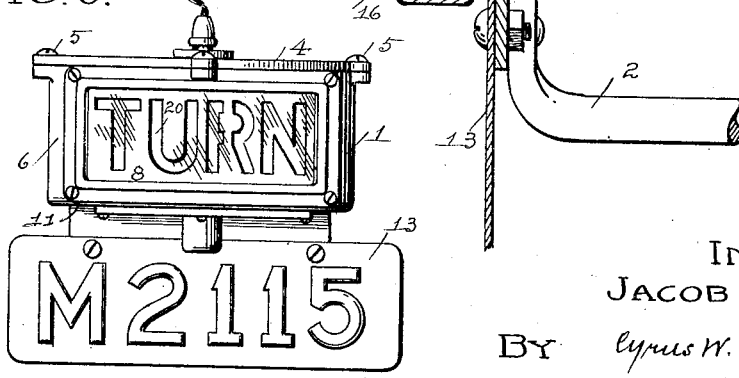
INVENTOR
JACOB KLUNDER
BY Cyrus W. Rice
ATTORNEY

UNITED STATES PATENT OFFICE.

JACOB KLUNDER, OF GRAND RAPIDS, MICHIGAN.

DIRECTION-INDICATOR AND TAIL-LIGHT FOR VEHICLES.

1,351,913.     Specification of Letters Patent.     Patented Sept. 7, 1920.

Application filed November 5, 1919. Serial No. 335,885.

*To all whom it may concern:*

Be it known that I, JACOB KLUNDER, a citizen of the United States, residing at Grand Rapids, in the county of Kent and State of Michigan, have invented new and useful Improvements in Direction-Indicators and Tail-Lights for Vehicles, of which the following is a specification.

The present invention relates to direction indicators for vehicles and to the same in combination with tail lights for vehicles; and its object is, generally, to provide an improved " direction indicator " for automobiles and other vehicles and an improved device of that character in combination with a " tail light " for such vehicles.

This, with more specific objects appearing hereinafter, is attained by, and the invention finds preferable embodiment in, the structure hereinafter particularly described and illustrated by the accompanying drawings, in which:—

Figure 1 is a sectional view of a device of the character above described, taken on a horizontal plane corresponding to line 1—1 of Fig. 2;

Fig. 2 is a sectional view of the same taken on a vertical plane corresponding to line 2—2 of Fig. 1; and Fig. 3 is a rear view, reduced in size, of said device.

In the embodiment of the invention chosen for illustration by the drawings and for detailed description in the body of this specification, my combined direction indicator and tail light has a casing 1 secured to the rear of the vehicle (not shown) as by a bracket 2. This casing is preferably circular in plan or horizontal section, as shown, and has an open top 3, covered by a closure 4 removably secured to the casing as by screws 5. This casing is opaque, except that at its rear its side wall 6 has a light-transmitting portion—the opening 7—covered as by uncolored glass 8, so that the signals inside the casing may be distinctly seen from behind the vehicle and the light 9 within may illuminate such signals: the casing has also a second light-transmitting portion—the opening 10—through its bottom wall 11 covered as by uncolored glass 12, whereby the same light 9 may illuminate the license plate 13.

Within the casing, a member designated generally 14, is turnably mounted on a vertical axis, the journal 15 on its lower side being freely insertible into and freely removable from the bearing 16 in the bottom of the casing. This member 14 has a plurality of arms 17 extending first radially and then upwardly whereon is carried an arcuate opaque strip 18 displaying appropriate signals, 19 and 20, as the word " Stop " at 19 and the word " Turn " at 20. These signals, as the words " Stop " and " Turn", are translucent so that they may be distinctly seen from behind the vehicle by the light 9 shining through them. The member 14 also carries an arcuate strip 21, colored preferably red so that in the normal position of the member 14 the light may shine therethrough, such strip 21 and the light 9 within the member 14 thus constituting the " tail light " of the vehicle.

A suitable spring, as the spiral spring 22, presses the member 14 into its normal position (wherein the colored strip 21 is adjacent the opening 7), the member 14 being stopped in that position by a suitable stop 23. The member 14 may be turned one-third way around or two-thirds around against the pressure of this spring by suitable means, extending outside the casing and to a point convenient for the driver or chauffeur to operate the same, as by the strap or cord 24 wound on a drum 25 carried by the member 14 and concentric with its journal 15: when the member 14 is thus turned one-third way around from normal position, the signal 19 " Stop " will be moved to a position registering with or adjacent to the opening 7; and when the member 14 is turned two-thirds of the way around the signal 20 " Turn " will be brought into such registration. One end of the spiral spring 22 is connected as by the bolt 26 to the under side of the member 14 and the other end of the spring is detachably connected as by the bolt 27 to the casing 1, such bolt passing through an orifice 28 in the casing. This spring not only urges the member 14 into its said normal position but also serves to hold the journal 15 against axial movement in its bearing 16, inasmuch as the two ends of the spring are attached at points (*i. e.* on the member 14 and on the casing 1) so interrelatively located, as shown, that the spring is tensioned to draw these two points of attachment toward each other.

It will be seen that the member 14 carrying the signal displaying strip 18 and the colored translucent strip 21, (they constituting the side wall of said member), is open at the top, so that the light 9, (preferably an electric light bulb as shown) is in nowise interfered with, no matter to what position said member 14 may be turned; also that this member 14 has a practically open bottom, so that the light may shine through the opening 10 in the bottom of the casing directly upon the license plate; and that the light is in no case obscured, in any position in which the member 14 may be, from thus illuminating the license plate, nor is such illuminating in any degree diminished, as it would be if the light must first pass through any of the signals before reaching the license plate.

Furthermore, it will be seen that the parts of my device may be very readily assembled and disassembled. The closure 4 carrying the light 9 being removed, a screw driver may be inserted through the orifice 30 in the member 14 and applied to the bolt 27 to unscrew the same: this done, the casing together with its signals and the colored strip 21 may be lifted out. In reassembling, the journal 15 is inserted into its bearing 16, the operator's fingers may be inserted through the orifice 30 to insert the bolt 27 into the opening 28 in the casing, the nut screwed on said bolt, and the closure 4 secured in place.

The invention being intended to be pointed out in the claims, is not to be limited to or by details of construction of the particular embodiment thereof hereinbefore described or illustrated by the drawings.

I claim:

1. In a device of the character described; a casing having a light-transmitting portion; a turnable member within the casing carrying signals; a bearing in which said member is turnable; a spring pressing said member into said bearing and into one turned position; means extending outside the casing for turning said member to another turned position; a light within said member.

2. In a device of the character described; an open-top casing having a light-transmitting side portion; a closure for the open top of the casing removably secured thereto; a member insertible into the casing through its open top and carrying signals and having a journal; a bearing into which the journal is freely insertible and in which said member is turnable to move one or another of the signals to a position adjacent said light-transmitting portion; a light within said member and carried by the closure; means extending outside the casing for turning said member.

3. In a device of the character described; an open-top casing having at its side a light-transmitting portion; a closure for the open top of the casing removably secured thereto; a member insertible into the casing through its open top and carrying signals and having a journal; a bearing into which the journal is freely insertible and in which said member is turnable to move one or another of the signals to a position adjacent said light-transmitting portion; a spiral spring pressing said member into one turned position and being secured at one end to said member and being detachably secured at the other end to the casing; means extending outside the casing for turning said member to another turned position; a light within said member.

4. In a device of the character described; a casing having at its side a light-transmitting portion and at its bottom a light-transmitting portion; signals carried by the hereinafter mentioned member; a light within said hereinafter mentioned member; a member within the casing having an open bottom through which and through the casing's second light-transmitting portion, said light may shine directly, said member being mounted turnably on an axis transverse to its open bottom to move one or another of the signals to a position adjacent the casing's first light-transmitting portion; means extending outside the casing for turning said member.

In testimony whereof I have hereunto set my hand at Grand Rapids, Michigan, this 31st day of October, 1919.

JACOB KLUNDER.